United States Patent
Török et al.

(10) Patent No.: US 12,462,424 B2
(45) Date of Patent: *Nov. 4, 2025

(54) LOCALIZATION OF A SURVEYING INSTRUMENT

(71) Applicant: LEICA GEOSYSTEMS AG, Heerbrugg (CH)

(72) Inventors: Zoltán Török, Berneck (CH); Thomas Mörwald, Bregenz (AT); Franz Thurnhofer, Hörbranz (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 425 days.

This patent is subject to a terminal disclaimer.

(21) Appl. No.: 18/087,664

(22) Filed: Dec. 22, 2022

(65) Prior Publication Data

US 2023/0316567 A1    Oct. 5, 2023

Related U.S. Application Data

(63) Continuation-in-part of application No. 16/991,890, filed on Aug. 12, 2020, now Pat. No. 11,568,559.

(30) Foreign Application Priority Data

Aug. 12, 2019  (EP) ..................... 19191324

(51) Int. Cl.
*G06T 7/73* (2017.01)
*G01C 11/02* (2006.01)
(Continued)

(52) U.S. Cl.
CPC ............... *G06T 7/74* (2017.01); *G01C 11/02* (2013.01); *G01C 11/06* (2013.01); *G01C 15/002* (2013.01); *G06T 7/20* (2013.01); *G06T 19/20* (2013.01)

(58) Field of Classification Search
CPC .. G06T 7/74; G06T 7/20; G06T 19/20; G06T 2207/10032; G06T 7/579; G01C 11/02; G01C 11/06; G01C 15/002
See application file for complete search history.

(56) References Cited

U.S. PATENT DOCUMENTS 9,958,269 B2    5/2018  Metzler et al.
11,568,559 B2 *  1/2023  Török ..................... G01C 11/02
(Continued)

FOREIGN PATENT DOCUMENTS

DE    11 2006 003 390      5/2019
EP          3 034 995          6/2016
(Continued)

OTHER PUBLICATIONS

European Search Report dated Feb. 12, 2020, as received in application No. 19 19 1324.

*Primary Examiner* — Ayodeji O Ayotunde
(74) *Attorney, Agent, or Firm* — Maschoff Brennan

(57) ABSTRACT

A method for surveying an environment by a movable surveying instrument with a progressional capturing of 2D-images by at least one camera and applying a visual simultaneous location and mapping algorithm (VSLAM) or a visual inertial simultaneous location and mapping algorithm (VISLAM) with a progressional deriving of a sparse evolving point cloud of at least part of the environment, and a progressional deriving of a trajectory of movement. The method comprises a progressional matching of the sparse evolving point cloud with a previously derived 3D-geometry, with a minimizing of a function configured to model a distance between the sparse point cloud and the previously derived 3D-geometry and deriving a spatial localization and orientation of the surveying instrument. At least one surveying measurement value of the environment by a spatial (Continued)

measurement unit is combined with the sparse point cloud or the previously derived 3D-geometry.

20 Claims, 3 Drawing Sheets

(51) Int. Cl.
    *G01C 11/06*     (2006.01)
    *G01C 15/00*     (2006.01)
    *G06T 7/20*     (2017.01)
    *G06T 19/20*     (2011.01)

(56) References Cited

U.S. PATENT DOCUMENTS

| | | |
|---|---|---|
| 2007/0139262 A1 | 6/2007 | Scherzinger |
| 2011/0043620 A1 | 2/2011 | Svanholm |
| 2011/0102255 A1 | 5/2011 | Scherzinger |
| 2011/0238303 A1 | 9/2011 | Scherzinger |
| 2016/0187130 A1 | 6/2016 | Metzler et al. |
| 2018/0158200 A1 | 6/2018 | Metzler |
| 2019/0360806 A1 | 11/2019 | Ohtomo |

FOREIGN PATENT DOCUMENTS

| | | |
|---|---|---|
| EP | 3 222 969 | 9/2017 |
| EP | 3333538 A1 | 6/2018 |
| EP | 3 614 101 | 2/2020 |
| EP | 18 190 344 | 2/2020 |
| WO | 2015/001063 | 1/2015 |
| WO | 2019/018315 A1 | 1/2019 |

* cited by examiner

LOCALIZATION OF A SURVEYING INSTRUMENT

CROSS-REFERENCE TO RELATED APPLICATIONS

This application claims priority to European Patent Application No. 19191324.3, filed on Aug. 12, 2019. The foregoing patent application is herein incorporated by reference.

FIELD OF INVENTION

The invention relates to a method for localization of a movable surveying instrument, which can also at least partially be embodied as a stored computer program product, and to a corresponding movable surveying instrument according.

BACKGROUND

In the technical field of surveying, in particular with a construction work or geodetic accuracy, it is often not only demanded to establish exact measurements of the environment by the instrument, but also to derive a localization of the instrument in its environment. Therein, in particular in view of automated BIM (building information modeling) Systems and Databases, the demands on correctness and in particular on unambiguousness is increasing, wherefore e.g. a basic localization by defining a site, location, building or room by manual notes from an operator or by GNSS (like GPS, etc.) is not adequate any more. Also, GNSS can only be used outdoors and tends to have a rather limited accuracy and reliability. Surveying instruments are also used over a long time—but often with pauses in-between when the instrument is shut down to save power—and/or are the instruments (as expensive singular resources) are often moves at the site along some random trajectories from one measurement to the next. Therefore, ambiguousness and/or drift of the localization can be quite problematic, sometimes even more problematic than the actually achievable position and/or orientation accuracy of the localization.

For example, the patent application EP 18 190 344 proposes a capturing of a coarse 3D-model by a surveying device with a 3D-sensor-unit, which information is then used to derive the actual measurements with high accuracy by the surveying device. Also documents like e.g. DE 11 2006 003 390, WO 2015/001063, US 2011/238303, EP 3 333 538, EP 3 222 969, EP 3 034 995, US 2011/102255, are related to various localization approaches.

Such a localization of an instrument to a local or global coordinate system at an environment where measurements have to be taken is a tedious and error prone task. State of art setup workflows for such measurements include the use of GNSS and/or the measurement of one or multiple reference points, which often requires a rather burdensome usage of a prism pole or the like.

Some recent approaches are trying to make use of visual inertial SLAM systems, but those tend to be even more unstable, more inexact and in particular more unreliable and not reproducible—in particular drifting of the location results is an issue. The quality of the automated localization of an instrument by doing so is therefore hardly usable in a surveying system, in particular in an automated way without a human operator always checking plausibility.

BRIEF DESCRIPTION

It is therefore an object of some aspects of the present invention improve a localization of a surveying instrument, in preferably in an automated way that requires no or hardly any interaction by the operator of the instrument.

It can e.g. be seen as a particular object of some aspects to provide an automated and robust localization method, preferably applicable for various surveying instruments, in particular a method which can provide the necessary accuracy and/or don't need or at least reduces error prone user interaction.

It is also an object to of some aspects provide reasonable accuracy over a long time and/or over a long trajectory of movement of the instrument, as it is often required at a worksite.

An aspect of some embodiments therein is also that the localization can be established with respect to a real world, on the site reference coordinate system, which is preferably not only a theoretical one, but a real world or as built coordinate system. Such a real world coordinate system can often deviate from the planed one, be it as a result of tolerances, mistakes, aging, etc. or simply as the environment itself changes, e.g. as dimensions of a building changed due to adaptions or application of new cladding or insulation, by attachments of additional constructions, by unplanned items or vegetation at the site, etc. Yet, there is preferably also a reference to a previous three-dimensional (3D) measurement or the theoretical plan established.

It is also an object of some embodiments to provide a method which can enable an operator to work over a long time and/or a long trajectory of movements of the surveying instrument, while preserving a reasonably high accuracy, reliability, and no inconsistences. It is in particular an object of some embodiments to overcome the drift, as it e.g. often occurs in a visual inertial system.

Those objects are achieved by realizing the features of the independent claims. Features which further develop the invention in an alternative or advantageous manner are described in the dependent patent claims.

SUMMARY OF THE INVENTION

The present invention relates to a method for surveying an environment by a movable surveying instrument configured as a Laser-Scanner, a Theodolite, a GNSS-Surveying antenna, a Mobile-Mapping-System, a surveying pole unit, or a Surveying-Field-Controller configured to be carried by a human, a robot, a drone, a vehicle or a transport dolly in its environment along a substantially random trajectory. The method comprising:
  performing a progressional capture of two-dimensional (2D)-images by at least one camera at the surveying instrument and applying a visual simultaneous location and mapping algorithm (VSLAM) or a visual inertial simultaneous location and mapping algorithm (VIS-LAM) with:
    a progressional deriving of a sparse evolving point cloud of at least part of the environment of the surveying instrument, and
    a progressional deriving of a trajectory of movement of the surveying instrument with respect to the sparse evolving point cloud, performing a progressional matching of the sparse evolving point cloud with a
  previously derived three-dimensional (3D)-geometry of at least part of the environment, wherein said previously derived 3D-geometry is derived from a previously captured 3D measurement, with a minimizing of a function which is configured to model a distance between the sparse point cloud and the previously derived 3D-geometry, deriving and providing of a spatial localization and orientation of the surveying instrument in relation to the previously derived 3D-geometry according to the progressional matching.

In other words, some aspects of the present invention relate to a method for surveying an environment and/or deriving and providing a localization of a movable surveying instrument with respect to its environment. The method is preferably executed during carrying or movement of the instrument and maybe immediately after until a static result is found. The surveying instrument is therein movable in its environment along a substantially random trajectory and configured to be carried by a human, preferably configured to be hand-carried e.g. by a handle or optionally configured as a shoulder bag or a backpack. The surveying instrument is further configured to be carried by, for example, a robot (e.g. a legged robot), a drone, a vehicle (e.g. a UAV, AGV, or car) or a (tripod) transport dolly. The surveying instrument is therein a geodetic instrument configured as a Laser-Scanner, a Theodolite, a GNSS-Surveying antenna, a Mobile-Mapping-System, a surveying pole unit, and/or a Surveying-Field-Controller. In an embodiment, the surveying instrument can therein comprise a measurement unit for deriving measurement values with geodetic accuracy, e.g. in a range below centimeters. The movable surveying instrument is configured to be carried, which in particular means that it is a non-autonomous instrument and not configured as an autonomous vehicle like a UAV, AGV, drone, robot, rover, car or the like, which is configured with a drive unit for the movement and uses a SLAM approach for its own autonomous navigation in the environment. However, this does not exclude the possibility that the surveying instrument is carried by, for example, a robot, a drone, a vehicle or a transport dolly as described above. The surveying instrument according to the invention is an instrument configured and designed for the primary purpose of taking exact measurements of its environment, in particular to derive plan-data for construction work, manufacturing or the like. The surveying instrument is configured to derive distances and or angular measurement values which are to scale in defined real world measurement units.

The method comprises a progressional capturing of a sparse evolving point cloud of at least part of the environment of the surveying instrument and a progressional deriving of a trajectory of movement of the surveying instrument position with respect to the sparse evolving point cloud. The capturing of the sparse evolving point cloud comprises a progressional capturing of 2D-images by at least one camera at the surveying instrument and applying a visual simultaneous location and mapping algorithm (VSLAM) based on the progressional series of camera images during the movement of the instrument. The VSLAM can also be implemented as a visual inertial simultaneous location and mapping algorithm (VISLAM) with also takes into account measurement values of inertial sensors such as accelerometers, gyroscopes or the like for the deriving of the sparse evolving point cloud. The point cloud is sparse, which means that not for every image-pixel a depth value is derived, and it is evolving, which means that it is not a static snapshot, but the SLAM algorithm continuously tries to derive points for the point cloud, in particular upon a change or addition of an image.

In some embodiments, the previously derived 3D-geometry is a 3D point cloud (hereinafter referred to as previously derived 3D point cloud).

In some embodiments, the previously captured 3D measurement is a scan taken with a terrestrial laser scanner.

In some embodiments, the previously captured 3D measurement are several scans registered relative to each other taken with the terrestrial laser scanner from different locations.

For performing the progressional matching of the sparse evolving point cloud with the previously derived 3D-geometry (e.g. a previously derived 3D point cloud, in particular a previously derived sparse (evolving) 3D point cloud) of at least a part of the survey environment, it is necessary to have derived a 3D-geometry for at least a part of the surveying environment at an earlier time than the survey of the environment by the movable surveying instrument.

For this purpose, either the surveying instrument itself or any other device configured for a capturing of a 3D measurement (e.g. a terrestrial laser scanner, which performs a scan from which a 3D point cloud is obtained) is set up in the surveying environment in order to perform a 3D measurement (e.g. a laser scan) of at least part of the surveying environment at an earlier time (e.g. on the previous day) than the surveying of the environment by the movable surveying instrument. By doing this, for example, the deriving of a previously derived 3D point cloud, in particular a previously derived sparse 3D point cloud, of at least part of the environment to be surveyed is achieved. In some embodiments, the previously derived 3D-geometry, in particular the previously derived 3D point cloud (i.e., point cloud data), is stored, for example, on a storage medium (e.g., the hard disk of a personal computer), in a cloud, a storage unit of the surveying instrument, etc.) and loaded from there at any time for performing the progressional matching of the sparse evolving point cloud with the previously derived 3D-geometry, in particular with the previously derived 3D point cloud.

In some embodiments, progressional matching of the sparse evolving point cloud with the previously derived 3D-geometry, in particular the previously derived 3D point cloud, is performed by ray casting (2D to 3D), visual matching (2D to 2D), and/or geometric matching (3D to 3D).

In some embodiments, the deriving of the previously derived 3D-geometry as the previously derived 3D point cloud, in particular as the previously derived sparse 3D point cloud, can e.g. be established by a visual simultaneous localization and mapping (VSLAM) unit. The VSLAM can comprise progressional capturing of a series of images from at least one camera at the surveying instrument or a device configured for progressional capturing of 2D-images, which can be a 2D-visual camera. Based on these images, a VSLAM algorithm continuously derives the dynamically adapting previously derived 3D point cloud, in particular as the previously derived sparse 3D point cloud, of the environment. This is done in particular during a movement of the surveying instrument (or another surveying instrument or a pole equipped with at least one camera (e.g. a smart pole), etc.) along any random trajectory in the environment. The VSLAM algorithm can therein comprise a tracking and triangulating of identified visual features and/or landmarks in a plurality of those images of the series of images. Based thereon, a deriving of at least three dimensional coordinates of the visual features and/or landmarks can be established, which coordinates can form points in the previously derived 3D point cloud, in particular the previously derived sparse 3D point cloud. In another preferred embodiment, the present invention can use 3D-sensor-unit embodied by a visual inertial SLAM unit, which comprises one or more visual cameras as well as an inertial sensor, e.g. an IMU-unit providing data in 6 degrees of freedom, optionally also equipped with an electronic compass module.

Such a visual inertial SLAM (simultaneous localization and mapping) system can be based on triangulated, 3D point clouds, which are created out of visually tracked features in a series of camera images. Preferably, these point clouds are sparse or semi-dense point clouds (e.g. with a resolution in a range of a few, tens or hundreds of ppsm (=points per square meter) or less—in contrast to a dense or high resolution point clouds having a resolution of many thousands of ppsm or a dimensional resolution in or below a millimeter range).

Some embodiments of the present invention comprise a detecting of differences between the previously derived 3D-geometry, in particular the previously derived 3D point cloud, and the sparse point cloud, preferably during the solution of the optimization problem. If, for example, certain objects were present in the environment during a previous 3D measurement process (e.g. a laser scan performed by a terrestrial laser scanner from which a 3D point cloud is obtained), these were captured in the previously derived 3D-geometry, in particular in the previously derived 3D point cloud, of the environment. If these objects are no longer present at the time of the survey of the environment by the movable surveying instrument, they are no longer captured during the progressional capturing of the 2D-images and the corresponding points are therefore no longer present in the sparse point cloud of the environment. By performing the progressional matching of the sparse point cloud with the previously derived 3D-geometry, in particular with the previously derived 3D point cloud, differences (e.g. between the respective point cloud data) are identified, from which the differences in the measurement environment can then be determined for the respective measurement processes. Of course, this example also works in reverse, i.e. if certain objects were not present in the environment during the previous 3D measurement process, which are present at the time of the survey of the environment by the movable surveying instrument. Furthermore, the states of windows or doors can also be determined during the respective measurement processes, for example.

Such can bring improvements in the robustness of the localization in the sparse point cloud and/or such differences can also be provided as information quality assurance, e.g. for the architect. Therein, the differences can be geometrical differences, which can be derived in the matching.

In some embodiments, differences such as objects or obstacles obstructing the information of the previously derived 3D-geometry, in particular of the previously derived 3D point cloud, are automatically identified and/or classified, which can be done in the sparse point cloud, in the progressional captured 2D-images or preferably in a combination of those. For example, by identifying furniture or a car or a tree in front of a building, the present invention can configure the matching to omit those obstructed areas of a building in the optimization problem—which will result in more optimized results with a lower error coefficient and better accuracy of the localization. Dependent on their classification of being static building deviations or being temporary such as a car, those identified objects or items can be provided to be included into a database or just omitted for the matching.

In some embodiments, the method further comprising deriving of at least one surveying measurement value of the environment by a spatial measurement unit of the surveying instrument and combining the exact measurement with the sparse point cloud or the previously derived 3D-geometry.

In some embodiments, the functional comprises at least a parameter of a pose or a parameter of a position of points in the sparse point cloud.

In some embodiments, the method further comprising a progressional identifying or an updating of correspondences of the sparse point cloud and the previously derived 3D-geometry according to the minimizing of the functional.

In some embodiments, the minimizing of the function and the identifying or updating of correspondences are executed iteratively in a process of optimization performed in a progressional loop while optimizing a cost-function.

In some embodiments, the minimizing of the function is configured in such a way that a drift in the sparse evolving point cloud is compensated for with a progressive, dynamical adapting of an absolute relation of the sparse evolving point cloud and the previously derived 3D-geometry.

In some embodiments, the drift in the sparse evolving point cloud is determined and/or compensated by searching for point-to-point correspondences of the sparse evolving point cloud and the previously derived 3D-geometry.

In some embodiments, deriving of the sparse evolving point cloud is done by a visual simultaneous localization and mapping (VSLAM) unit or by a visual inertial simultaneous localization and mapping (VISLAM) unit, with a progressional capturing of a series of images from at least one camera at the surveying instrument, and with a dynamically adapting of the sparse evolving point cloud of the environment progressively during runtime on basis of those images.

In some embodiments, the progressional matching is done with a synchronizing of the sparse evolving point cloud and the previously derived 3D-geometry in at least three dimensions.

In some embodiments, the progressional matching comprises a progressional deriving of a 2D-floorplan by a substantially vertical projecting of points of the sparse evolving point cloud to a substantially horizontal plane.

In some embodiments, the method further comprising an automatic identification of objects in the sparse evolving point cloud or in 2D-images of the environment, which objects are absent in the previously derived 3D-geometry or an automatic identification of deviations of dimensions in the sparse evolving point cloud compared to the previously derived 3D-geometry.

In some embodiments, the method further comprising supplementing or updating the previously derived 3D-geometry of the environment according to the identified objects or deviations.

In some embodiments, the surveying pole unit is configured for
 being attached to a surveying pole, or
 being comprised by a GNSS-Surveying antenna which is attached to the surveying pole.

This surveying pole unit can be configured as an independent unit, which for example has one or more cameras and can be configured to take images during the positioning and alignment of the surveying pole/prism pole in the surveying environment. These images can then be used, for example, in the method according to the invention for the progressional deriving of the sparse evolving point cloud of at least part of the environment of the surveying instrument.

The surveying pole unit can also be integrated into a GNSS surveying antenna of a so-called smart pole, whereby a smart pole is obtained which can perform a simplified positioning and alignment by its GNSS system and at the same time can perform the method according to the invention by means of the surveying pole unit.

The present invention further relates to a movable surveying instrument configured as a Laser-Scanner, a Theodolite, a GNSS-Surveying antenna, a Mobile-Mapping-System, a surveying pole unit, and/or a Surveying-Field-Controller configured to be carried by a human, a robot, a drone, a vehicle or a transport dolly in its environment along a substantially random trajectory. The moveable surveying instrument comprising:

- at least one visual camera configured to constantly capture a series of images of an environment;
- a three-dimensional (3D) point cloud evaluation unit configured to constantly derive an at least sparse evolving point cloud of the environment based on the series of images with a visual simultaneous localization and mapping (VSLAM) unit or by a visual inertial simultaneous localization and mapping (VISLAM) unit;
- a 3D-geometry access unit, configured to access a previously derived 3D-geometry of at least part of the environment, wherein said previously derived 3D-geometry is derived from a previously captured 3D measurement;
- a matching unit configured to constantly match the sparse evolving point cloud and the previously derived 3D-geometry with a minimizing of a function that is configured to model a distance between the sparse point cloud and the previously derived 3D-geometry; and
- a localization unit configured to continuously derive and provide a localization or orientation of the surveying instrument in the environment with respect to the previously derived 3D-geometry based on a result of the matching unit.

In some embodiments, the previously derived 3D-geometry is a 3D point cloud.

In some embodiments, the previously captured 3D measurement is a scan taken with a terrestrial laser scanner.

In some embodiments, the previously captured 3D measurement are several scans registered relative to each other taken with the terrestrial laser scanner from different locations.

In some embodiments, the matching unit comprises a solver unit configured for an optimization problem that is configured to constantly optimize a localization of the surveying instrument with respect to the previously derived 3D-geometry.

In some embodiments, the sparse evolving point cloud is derived by a visual simultaneous localization and mapping (VSLAM) unit or by a visual inertial simultaneous localization and mapping (VISLAM) unit, configured such that the dynamically adapting sparse evolving point cloud of the environment is progressively derived based on the series of images from the at least one camera at the surveying instrument, and a spatial measurement unit of the surveying instrument is configured to provide its measurements referenced to the localization or orientation of the surveying instrument.

In some embodiments, the surveying pole unit is configured for
- being attached to a surveying pole, or
- being comprised by a GNSS-Surveying antenna which is attached to the surveying pole.

The present invention further relates to a computer program product with non-transitory program code being stored on a transitory machine readable medium, the computer program code being configured for the execution of the method according to the invention (the method of claim 1).

Further Aspects of the Disclosure

The method according to some aspects of the invention comprises a progressional matching of the sparse evolving point cloud with a known CAD-geometry, like a known theoretical plan- or CAD-information of at least part of the environment, and a progressional determining and providing of a spatial localization and orientation of the surveying instrument in relation to the known plan- or CAD-information according to the matching. The matching is done with a minimizing of a mathematical functional, which is configured to model or reflect distances between the points of the sparse point cloud and the known CAD-geometry. Such a functional can e.g. comprise at least a parameter of a pose and/or a parameter of a position of points in the sparse point cloud.

Upon deriving of at least one exact surveying measurement value of the environment by a spatial measurement unit of the surveying instrument, a combining of this exact measurement with the sparse point cloud and/or the plan information can be established, in particular with a referencing and/or aligning the surveying measurement value to the known CAD-geometry according to the spatial localization and orientation. The spatial measurement unit is therein in particular a separate, additional unit besides and independent of the SLAM evaluation of the camera images.

In contrast to a dense point cloud, a sparse point cloud is a point cloud, in which not for all (or not for substantially all) of the recorded pixels, a depth value is evaluated, such that a 3D-voxel is derived. For the sparse point cloud, only for a fraction of the detected pixels of a camera, a depth value is determined, e.g. for less than half of the pixels or preferably for about 20% to 10% of the pixels or even less. For example, such a sparse point cloud can comprise some tens to a few hundred voxels, in an embodiment e.g. resulting in a point density in a range of about 0.5-2 pts/m$^2$ or the like. Progressional can herein be described as a consecutively or continuously processing on evolving or changing, not fully static data at runtime.

Evolving means that the point cloud is not a static single shot, like a singular capturing of a laser-scanner that is later on post-processed, but an ever changing continuously updated point cloud fed by an algorithm that continuously tries to extract points. Accordingly, also the matching and solving of the optimization problem according to the invention is done progressional or constantly, which can in particular mean periodically with a high update rate, preferably at least whenever the point cloud evolves.

The progressional matching according to some embodiments of the invention can therein be done with a solving of an optimization problem. In this optimization problem, a progressional adapting of a scaling and/or orientation of the floorplan and/or of the known theoretical plan- or CAD-information, is optimized to find an optimal correspondence or to minimize a geometrical error term of the matching. The method can comprise a continuous or progressional identifying or finding of correspondences of the sparse point cloud and the known CAD-geometry and/or an updating of those correspondences according to the minimizing of the functional, in particular comprising an executing of an iterative closest point (ICP) optimization algorithm. Therein, a correspondence of planes, normal, lines, edges, corners and or dimensions can be continuously optimized in a 2D or 3D space. Such an optimizing can e.g. comprise an iterative closest point (ICP) optimization algorithm, a least square fit or another optimization algorithm, in particular with a minimizing of distances in-between points of the point cloud and the known CAD-geometry and automatically finding correspondences and optimizing distances, preferably with a minimizing of closest point-to-plane distances. The minimizing of the functional and the identifying and/or updating of correspondences can therein be executed iteratively in a process of an optimization routine, e.g. in a progressional loop while optimizing a cost-function that can comprise an error term of the matching, preferably cost function rated for certain classes of points in the point cloud that are classified by a classification algorithm of an artificial intelligence system, e.g. being classified to be planes, lines, horizontal, vertical, or other geometries, or even one of certain known objects.

In an embodiment, the optimization problem can in particular be configured in such a way, that a drift in the sparse evolving point cloud is compensated for, e.g. with a progressive, dynamical adapting of an absolute relation of the sparse evolving point cloud and the known theoretical plan- or CAD-information and/or by an applying of a deformable theoretical plan- or CAD-information in the matching.

The deriving of the sparse evolving point cloud is done by an according 3D sensor unit that is configured to derive at least a sparse, (optionally also a dense) point cloud of the environment, which is continuously evolving over time. This means not taking a single static snapshot of the environment but a continuous ever changing and/or supplementing point cloud that evolves over time and/or movement of the surveying device.

For example, in an embodiment of the present invention in an indoor application—where often not even a GNSS-reference can be established—an often challenging and time consuming search and measurement of reference points can be eliminated by the present invention. But also in an outdoor application—in particular when GNSS is not available or GNSS accuracy is not sufficient, but also general applications—the present invention can ease a setup process of the surveying instrument.

In some embodiments, the 3D-sensor-unit can therein in particular be embodied as a RIM camera sensor, a stereo imaging sensor, a structured light sensor, a triangulation sensor, a structure from motion sensor, a simultaneous location and mapping sensor, or a depth image sensor. In a preferred embodiment, the progressive deriving of the sparse evolving point cloud can e.g. be established by a visual simultaneous localization and mapping (VSLAM) unit. The VSLAM can comprise a progressional capturing of a series of images from at least one camera at the surveying instrument, which can be a 2D-visual-camera. On basis of those images, a VSLAM algorithm continuously, preferably substantially in real time or progressively during runtime, derives a dynamically adapting, sparse evolving point cloud of the environment. This is in particular be done during a moving of the surveying instrument along any random trajectory in the environment. The VSLAM algorithm can therein comprise a tracking and triangulating of identified visual features and/or landmarks in a plurality of those images of the series of images. Based thereon, a deriving of at least three dimensional coordinates of the visual features and/or landmarks can be established, which coordinates can form points in the sparse evolving point cloud. In another preferred embodiment, the present invention can use 3D-sensor-unit embodied by a visual inertial SLAM unit, which comprises one or more visual cameras as well as an inertial sensor, e.g. an IMU-unit providing data in 6 degrees of freedom, optionally also equipped with an electronic compass module.

Such a visual inertial SLAM (simultaneous localization and mapping) system can be based on triangulated, 3D point clouds (or maps), which are created out of visually tracked features (or maps) in a series of camera images. Preferably, these point clouds are sparse or semi-dense point clouds (e.g. with a resolution in a range of a few, tens or hundreds of ppsm (=points per square meter) or less—in contrast to a dense or high resolution point clouds having a resolution of many thousands of ppsm or a dimensional resolution in or below a millimeter range). These point clouds are maintained and updated all the time while the system is in operation, when stationed as well as when moved around at the site.

In an embodiment of the invention, the progressional matching can be done with a synchronizing of the sparse evolving point cloud and the known theoretical plan- or CAD-information in at least three dimensions. The synchronizing can therein be embodied as a direct synchronizing of three dimensional points in the sparse evolving point cloud with points in the theoretical plan- or CAD-information and/or it can be embodied with an implicit synchronizing of correspondences of those points, for example comprising a RANSAC (random sample consensus) optimization algorithm. In other words, the optimizing can be established with the theoretical plan- or CAD-information as auxiliary condition to the optimization problem.

For example, the matcher algorithm can be optimizing a rotation and/or scaling of the CAD layout, until an optimal solution for the matching is found. Once this is fulfilled, the sparse evolving point cloud and thereby the actual pose of the surveying instrument is known with respect to the CAD design data, which can then be used as a basic spatial reference location for the measurement tasks to be executed by the surveying instrument.

The progressional matching can also be embodied to comprise a progressional deriving of a 2D-floorplan or a layout of the environment by a substantially vertical projecting of points of the sparse evolving point cloud to a substantially horizontal plane. In an example such a projecting can in particular comprise those of the points, which are arranged in non-equal horizontal planes and/or with a deriving of a density of the projected points in the plane, which has to be above a static or dynamically adapted limit in order to define a point in the 2D-floorplan. Preferably, a classifying of the points according to their planar accumulation in the projecting can be established. Then, a progressional matching of the thereby derived 2D-floorplan with the known theoretical 2D-plan or CAD-Information of the environment is established by solving an optimization problem in two dimensional space for deriving a 2D-localization, which can reduce complexity and require less resources than optimizing in full 3D-space of the sparse evolving point cloud.

In addition, there can be an evaluating of one or more substantially horizontal planes in the sparse evolving point cloud. With a defining of one or more of those substantially horizontal planes as a height reference in vertical direction, the before described 2D-localization can be referenced in a third direction resulting a 2.5D or 3D localization of the instrument.

Such a floor layout extracting from this point cloud can for example be embodied with a projecting of all points to the ground plane. A density of the projected points in the ground plane can then be evaluated as an indication for a presence of a vertical structure, like a wall or the like. The thereof resulting floor layout is then matched to known data, as e.g. a CAD site or a CAD floor plan. According to the present invention, this matching is done with a solving of an optimization problem. This matching is therein done progressional or continuously, for example during movement of the instrument, during measurement, during measurement pauses, etc., preferably substantially the whole time the measurement instrument is in the field to be used. By an embodiment solving the optimization problem with continuous variables, the present invention can not only overcome drawbacks because of a noisy and sparse SLAM layout. The present invention can therein also take into account that CAD plan might be outdated, may be a theoretical one that comprises dimensions as planned but not necessarily as built, or may not contain all real life objects, like trees, transient objects, furnishing, annexes, construction materials lying around, etc. All those aspects cause mismatches and/or ambiguities.

An embodiment of the invention can also comprise an automatic discerning or identifying of objects in the sparse evolving point cloud and/or in 2D-images of the environment. Such can comprise an identification unit, which can at least partially be configured by machine learning, for automatically identifying objects which are absent in the known plan- or CAD-information on basis of the sparse evolving point cloud and/or on basis of visual 2D-images of the environment. The automatic identifying can also relate to an automatic identifying of dimensional deviations in the sparse evolving point cloud compared to the known plan- or CAD-information. In an embodiment, this can also comprise an automatic classifying of the identified objects or deviations by a machine learned classifier. Such identification and/or classification can then—together with the localization information—be reported to a BIM system and/or to an operator of the surveying instrument.

Some embodiments of the present invention can therein also comprise a supplementing and/or updating of the known theoretical plan- or CAD-information of the environment according to the identified objects and/or deviations. For example, with an online updating of the known theoretical plan- or CAD-information of the environment in an online BIM-database, on a storage media or on a cloud storage.

In other words, an example of a specific embodiment of the present invention can be described to concern an automated localization system for a surveying instrument at a worksite environment. From a system and flexibility perspective, it might be an option to consider a visual inertial SLAM system, but such known to be bound to drift, wherefore such a localization approach on a site tends to be error prone and unreliable. In order to improve the accuracy of the instrument localization the present invention proposes a CAD-SLAM matching that is not executed one single time only but executed periodically or preferably substantially or quasi continuously, constantly or progressional on site, in particular during movement of the instrument or the instruments camera—since then the SLAM system can provide updates to the point cloud. By this progressional matching, the present invention can correct for drifts of the visual odometry system and can provide a robust and stable localization of the instrument.

Such an embodiment also allows to run the matching algorithm when only a small subset of the site has been seen by the SLAM system. The matching is executed periodically or preferably continuously to ensure that any drift of the SLAM system is minimized in its impact to the localization. Another aspect is a utilization of a deformable CAD layout model in the matching, which can be used to improve the matching when the SLAM system drifts. During the solving of the optimization problem, differences can be detected between the CAD model and the SLAM point cloud. For example, such differences can on the one hand improve the robustness of SLAM and/or on the other hand can be used for quality assurance for the architect or for a BIM information management system.

Some aspects of the present invention also relate to an according surveying instrument that is configured with a unit for carrying out the method described above, for example such as a Total-Station (TPS), a GNSS surveying system, a laser Scanner (TLS), a handheld laser distance meter, a surveying field controller, etc. or a combination of those that can be operated together for establishing a surveying task. Such a unit can e.g. comprise a computation unit and can also use data from various sensors which are already present at the instrument for other purposes, such as e.g. cameras, tilt sensors, IMUs, laser distance meters, etc. An embodiment of a movable surveying instrument according to the invention is configured with

- at least one visual camera configured to constantly capture a series of images of an environment,
- a 3D point cloud evaluation unit configured to constantly derive an at least sparse evolving point cloud of the environment based on the series of images,
- a plan information access unit, configured to access a known theoretical plan- or CAD-information of the environment,
- a matching unit configured to constantly match the sparse evolving point cloud and the known theoretical plan- or CAD-information, and
- a localization unit configured to derive and provide a localization of the surveying instrument in the environment with respect to the known theoretical plan- or CAD-information.

In an embodiment, the sparse evolving point cloud can therein preferably be derived by a visual simultaneous localization and mapping (VSLAM) unit, which is configured in such a way that, bases on the series of images from the at least one camera at the surveying instrument, the dynamically adapting sparse evolving point cloud of the environment is progressively derived.

The matching unit of the movable surveying instrument according to the invention can therein comprise a solver for an optimization problem that is configured to constantly optimize a localization of the surveying instrument with respect to the known theoretical plan- or CAD-information, preferably in a position and in an orientation, by solving a mathematical optimization problem in two or three dimensions, whereby robustness to drifts and deviations of the point cloud can be established as well as an absolute reference to the plan information and/or to global coordinates.

In other words, some aspects of the invention also relate to an instrument, device or system which is configured for the method according to the invention. The present invention therefore also relates to a movable or mobile surveying instrument which is configured to execute a method as described herein, in particular configured to provide a localization of the device with respect to a given theoretical plan information like a CAD-model. For example, such a device can comprise at least a computation unit, a 3D-senor unit to derive a sparse point cloud of its environment and access to a storage for the theoretical plan information, e.g. at a local or online storage media. In an embodiment the device can comprise a Simultaneous Localization and Mapping (SLAM) unit as 3D-sensor unit, configured for constructing or updating a map of an unknown environment while simultaneously keeping track of the device's location within it, which can be utilized in the deriving of the location information for the field of view of the camera image, in particular visual SLAM (VSLAM) that is evaluating the images from the camera.

An embodiment of the invention also relates to an according system providing the method, e.g. embodied as a computation unit. Such a device or system according to the present invention can comprise microcontrollers, microcomputers, DSPs or a programmable or hardwired digital logics, etc., wherefore the present invention can involve or be embodied as a computer program product with program code being stored on a machine readable medium or embodied as an electromagnetic wave (such as e.g. a wired or wireless data signal), which implements functionality according to the invention at least partially in software—which therefore is also an embodiment of the invention.

The computer program product can in particular comprise program code being configured for a continuously deriving or reading a sparse evolving point cloud of an environment, and for a reading a known theoretical plan- or CAD-information of the environment. The program code is then configured for a continuously matching of the sparse evolving point cloud with the known theoretical plan- or CAD-information, which is preferably done by solving a mathematical optimization problem, configured to be robust against drifts in the point cloud and deviations in-between the data to be matched by finding an optimized solution. The matching therein comprises a solving of an optimization problem, e.g. with a consecutively minimizing of a function which is configured to model a distance between the sparse evolving point cloud and the known CAD-geometry. The deriving of point cloud data and matching is therein done not only once, but continuously. As the point cloud is a live evolving point cloud of the environment, also the matching is done at least once per evolution of the point cloud. Preferably the solving of the optimization problem is done continuously with a continuously refining the localization of the instrument as a matching result.

By this matching, the program code is deriving a localization in the environment with respect to the known theoretical plan- or CAD-information, which localization is provided to the surveying instrument and/or to a BIM system.

BRIEF DESCRIPTION OF THE DRAWINGS

Devices, methods, systems, setups and computer programs according to the invention are described or explained in more detail below, purely by way of example, with reference to working examples shown schematically in the drawing. Specifically.

DETAILED DESCRIPTION

The diagrams of the figures should not be considered as being drawn to scale. Where appropriate, the same reference signs are used for the same features or for features with similar functionalities. Different indices to reference signs are used to differentiate between different embodiments of a feature which are exemplarily shown. The term "substantially" is used to express that a feature can, but in general is not required to be realized exactly up to 100%, but only in such a way that a similar or equal technical effect can be achieved. In particular slight deviation, due to technology, manufacturing, constructional considerations, etc. can occur, while still within the meaning of the scope.

Figure 1:
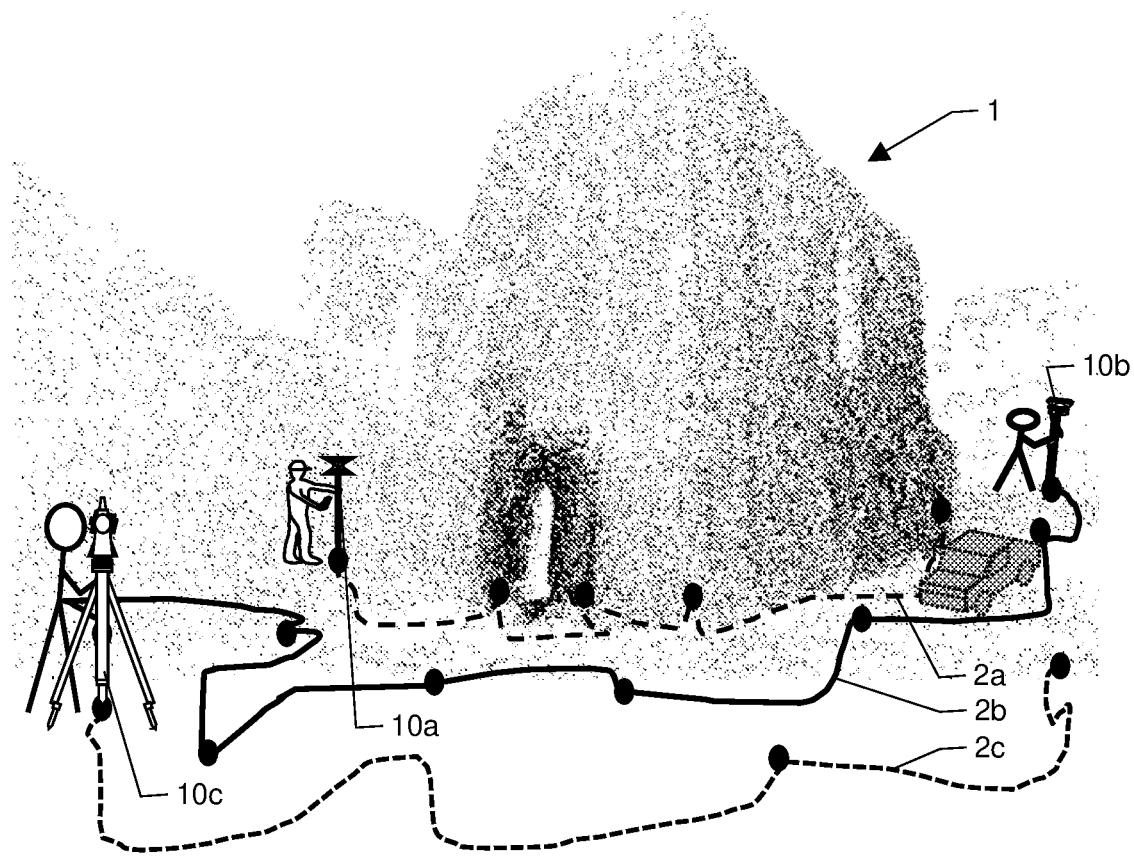
FIG. 1 shows an example of an embodiment of a surveying instrument usage according to the present invention.
Figure 1:
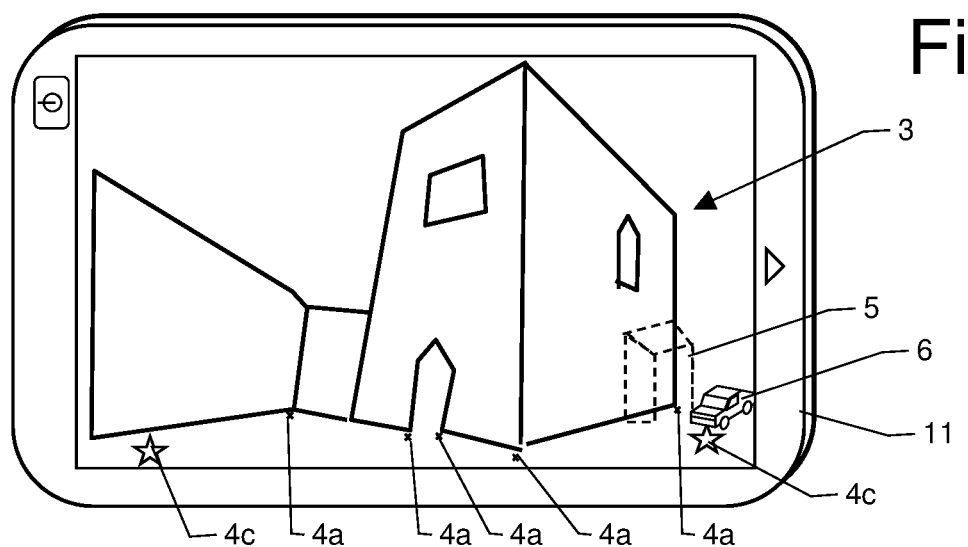

FIG. 1 schematically shows a possible example of an embodiment of an application of a method for localization of a movable surveying instrument with respect to its environment according to the invention.

A Localization of the surveying instrument to a local or global coordinate system is a tedious and error prone task. Current setup workflows include the use of GNSS and/or the measurement of one or multiple reference points with a prism pole or with reflectorless EDM. GNSS can be used only outdoor and furthermore it has limited accuracy. In indoor applications, only reference points can be used. To overcome such drawbacks, the present invention proposes an automated and robust localization method which can provide localization with the necessary accuracy and don't need error prone user interaction.

The surveying instrument is therein a geodetic surveying instrument which is specifically configured for a geodetic surveying task comprising dimensional measurements, for example such as a Total-Station (TPS), a GNSS surveying system, a laser Scanner (TLS), a handheld laser distance meter, a surveying field controller, etc. or a combination of those that can be operated together for establishing a surveying task. On the other hand, for example a smartphone or the like would not be a surveying instrument according to the present invention as it is primarily configured for communication and not for surveying and taking dimensional measurements. The surveying instrument is therein movable or mobile, which means it is configured to be moved around at a site to different locations—optionally also during the measurements—but does not relate to an autonomous vehicle such as a UAV, drone, AGV or the like.

In the example, there are three embodiments of instruments 10*a*, 10*b*, 10*c* illustrated, but present invention is executed individually at each of the instruments. During surveying, the instruments are moved around the site, which is indicated by the corresponding trajectories 2*a*, 2*b*, 2*c*. The dots at the trajectories are indicating stops in the movements.

The visual inertial SLAM (simultaneous localization and mapping) systems can therein be based on triangulated, 3D point clouds (maps) which are created out of visually tracked features. These point clouds are sparse or semi-dense point clouds and are maintained and updated all the time while the system is in use. Such a SLAM point cloud 1 is shown as an example.

The corresponding previously derived 3D-geometry 3 or theoretical plan data 3 is shown as an example on a (BIM) device 1, with the localizations 4 of the surveying instruments marked.

Figure 2:
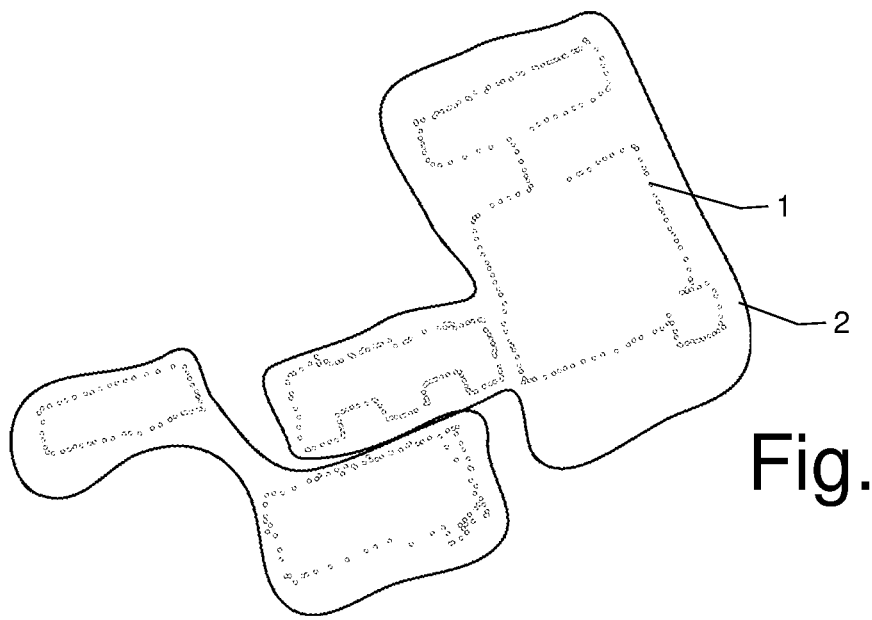
FIG. 2 shows an example of an embodiment of a sparse point cloud according to the present invention.

As the example in FIG. 2 illustrates, a sparse point cloud 1 and an instrument trajectory 2, wherein the point cloud can e.g. be derived by Structure from Motion (SfM) based on a series of camera images taken during the moving of the instrument along the trajectory, for example as described for one of the surveying instruments above.

In this view the point cloud is shown in a floorplan view to achieve better visualization. In an embodiment, the point cloud can also be a 3D point cloud and the further described matching is done in 3D space as described in FIG. 1.

In another embodiment the here and in the following described matching and optimizing can also be done as shown here in 2D space, which can simplify the evaluation and require less computational resources and energy as a matching and optimizing in full 3D space.

For example, such can also comprise a reduction or projection of the point cloud which is captured in 3D into a 2D floorplan. Therein, also floor level can be defined, e.g. identifying a ground plane in the point cloud and/or by inertial sensors and to use this floor level as height reference—e.g. resulting a 2.5 dimensional localization reference.

Figure 3:
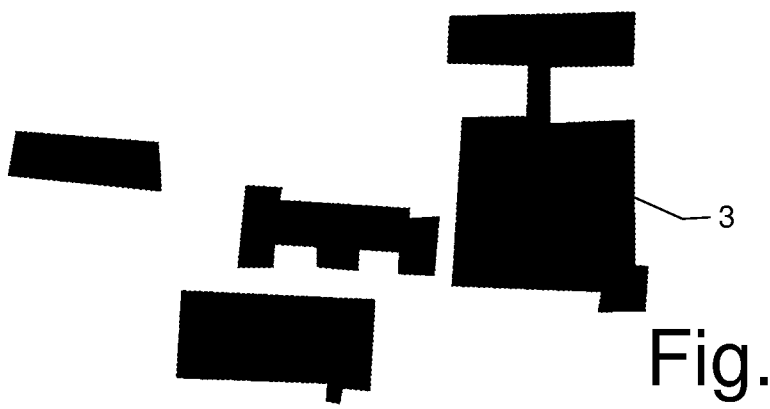
FIG. 3 shows an example of an embodiment of a previously derived 3D-geometry or CAD-Layout or plan according to the invention.

FIG. 3 shows an example of a previously derived 3D-geometry (e.g. a 3D point cloud, a 3D model of the environment, a building layout, etc.) or a theoretical building layout or plan information for the site shown above. Such information can be received/derived from a previously captured 3D measurement (e.g. a laser scan performed by a terrestrial laser scanner from which a 3D point cloud is obtained), from a BIM database, from geodetic information servers, from CAD models, digitized maps or plans or the like. The plan is therein theoretical, and it will most likely not match the real world or the point cloud—even if the point cloud would have an infinite precision. There can be many aspects and attachments in the sparse point cloud (real world), which are not given in the previously derived 3D-geometry or plan information, like vegetation, later additions, items standing around, auxiliary attachments to the building, cars, furniture, windows, doors shutters being randomly open or closed, etc.

Figure 4:
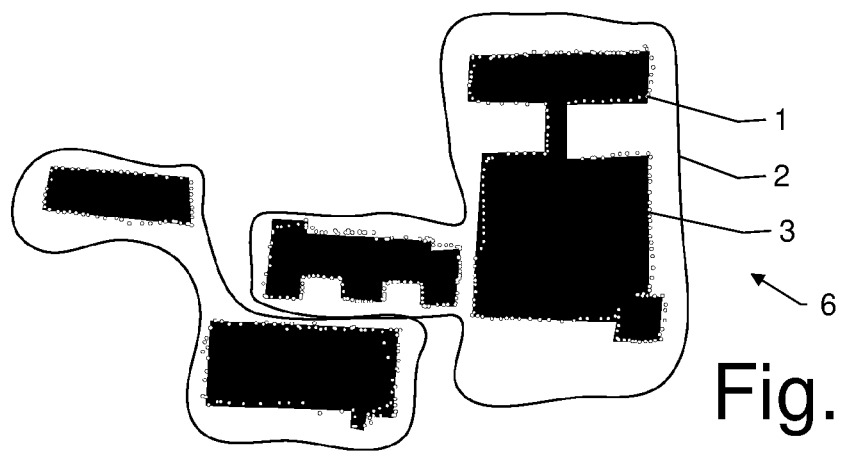
FIG. 4 shows an example according to the invention in which a previously derived 3D-geometry, in particular a previously derived 3D point cloud, or a CAD-Layout is matched with the sparse point cloud.

In FIG. 4 an example of an embodiment of the present invention is shown, in which the building layout out of the previously derived 3D-geometry or CAD model from FIG. 3 is matched with the corresponding point cloud shown in FIG. 2. Therein, the matcher algorithm optimizes the rotation and scaling of the previously derived 3D-geometry or theoretical plan information, until an optimal solution is found. Once this is fulfilled, the sparse point cloud and thereby the actual pose of the instrument is known with respect to the previously derived 3D-geometry or plan information—the instrument is thereby localized and this information can be provided for further processing, e.g. as a basic rough reference for an automatic target finding unit (ATR) or the like.

In order to improve the accuracy of the instruments localization in the environment according to the present invention, a (CAD-to-slam) SLAM matching is executed periodically, preferably quasi-continuously or continuously. Such can in particular provide a correcting for drifts of the localization when a visual odometry system is used to derive the sparse point cloud, especially for a point cloud that is continuously evolving over time.

The matching with solving an optimization problem according to the invention also enables to run the matching algorithm successfully, when only a small subset of the site has been seen by the SLAM system and the point cloud is very sparse and/or only covers fractions of the environment.

In another embodiment, a deformable previously derived 3D-geometry or CAD layout model can be used in the optimization problem of the matching to improve the matching when the SLAM system drifts. Therein the previously derived 3D-geometry or theoretical plan information or CAD-data is considered to be deformable in its dimensions and those dimensions are adapted by the optimization problem to result in a match. Preferably the deforming is therein done with constraints in proportionality and/or according to perspective considerations.

In an advanced embodiment the present invention can also comprise a detecting of differences between the previously derived 3D-geometry or theoretical plan information or CAD model and the sparse point cloud, preferably during the solution of the optimization problem. Such can bring improvements in the robustness of the localization in the point cloud and/or such differences can also be provided as information quality assurance, e.g. for the architect (or for a BIM system).

Therein, the differences can be geometrical differences, which can be derived in the matching. Another approach according to the present invention can also automatically identify and/or classify differences such as objects or obstacles obstructing the previously derived 3D-geometry or the theoretical information of the plan data, which can be done in the point cloud, in the images taken by the odometry system or preferably in a combination of those. For example, by identifying furniture or a car or a tree in front of a building, the present invention can configure the matching to omit those obstructed areas of a building in the optimization problem—which will result in more optimized results with a lower error coefficient and better accuracy of the localization. Dependent on their classification of being static building deviations or being temporary such as a car, those identified objects or items can be provided to be included into a (BIM) database or just omitted for the matching.

Figure 5:
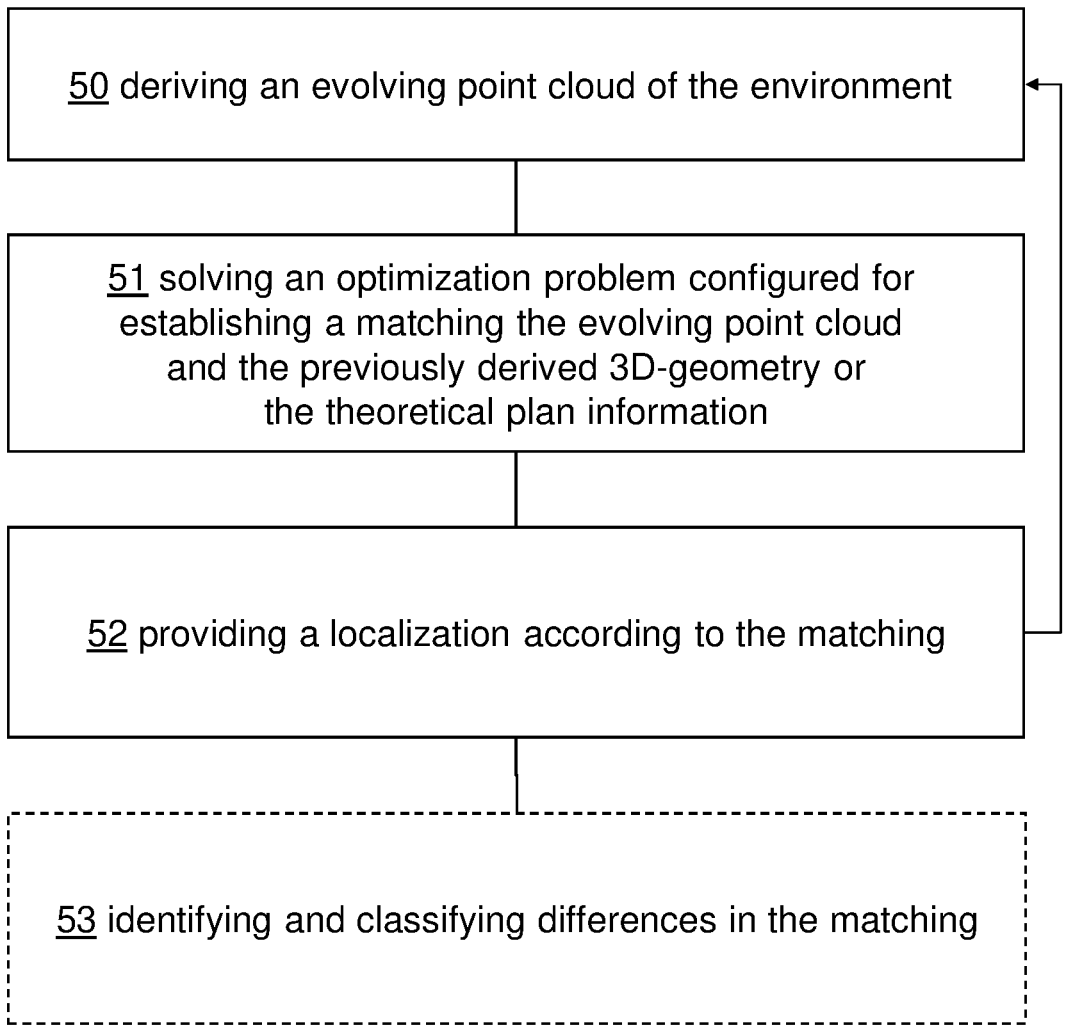
FIG. 5 shows an example of flow diagram of an embodiment of a method according to the present invention.

FIG. 5 shows an example of a simplified flow diagram of an embodiment of the present invention.

Box 50 symbolizes a capturing of a sparse point cloud by a 3d-capturing-unit, preferably by visual odometer device comprising a SfM or SLAM evaluation of images captured by one or more cameras at the surveying instrument. This is done continuously, in particular during moving of the instrument, resulting in an evolving point cloud.

Box 51 symbolizes a solving of an optimization problem in a matching algorithm that is configured for establishing a matching of the evolving point cloud and a previously derived 3D-geometry or a theoretical plan information. Details have been discussed above.

Box 52 symbolizes a providing of a localization according to the matching which is in reference to the previously derived 3D-geometry or the theoretical plan information. This localization can then be further processed by the surveying instrument and/or a (BIM) system, e.g. for taking measurement with the surveying instrument according to its localization.

Box 53 symbolizes an optional automatic identifying and classifying of differences in the matching as described above.

A skilled person is aware of the fact that details, which are here shown and explained with respect to different embodiments, can also be combined with details from other embodiments and in other permutations in the sense of the invention.

What is claimed is:

1. A method for surveying an environment by a movable surveying instrument configured as a Laser-Scanner, a Theodolite, a GNSS-Surveying antenna, a Mobile-Mapping-System, a surveying pole unit, or a Surveying-Field-Controller configured to be carried by a human, a robot, a drone, a vehicle or a transport dolly in its environment along a substantially random trajectory, the method comprising:

performing a progressional capture of two-dimensional (2D)-images by at least one camera at the surveying instrument and applying a visual simultaneous location and mapping algorithm (VSLAM) or a visual inertial simultaneous location and mapping algorithm (VISLAM) with:
a progressional deriving of a sparse evolving point cloud of at least part of the environment of the surveying instrument, and
a progressional deriving of a trajectory of movement of the surveying instrument with respect to the sparse evolving point cloud,
performing a progressional matching of the sparse evolving point cloud with a previously derived three-dimensional (3D)-geometry of at least part of the environment, wherein said previously derived 3D-geometry is derived from a previously captured 3D measurement, with a minimizing of a function which is configured to model a distance between the sparse point cloud and the previously derived 3D-geometry,
deriving and providing of a spatial localization and orientation of the surveying instrument in relation to the previously derived 3D-geometry according to the progressional matching.

2. The method according to claim 1, further comprising deriving of at least one surveying measurement value of the environment by a spatial measurement unit of the surveying instrument and combining the exact measurement with the sparse point cloud or the previously derived 3D-geometry.

3. The method according to claim 1, wherein the functional comprises at least a parameter of a pose or a parameter of a position of points in the sparse point cloud.

4. The method according to claim 1, further comprising a progressional identifying or an updating of correspondences of the sparse point cloud and the previously derived 3D-geometry according to the minimizing of the functional.

5. The method according to claim 4, wherein the minimizing of the function and the identifying or updating of correspondences are executed iteratively in a process of optimization performed in a progressional loop while optimizing a cost-function.

6. The method according to claim 1, wherein the minimizing of the function is configured in such a way that a drift in the sparse evolving point cloud is compensated for with a progressive, dynamical adapting of an absolute relation of the sparse evolving point cloud and the previously derived 3D-geometry.

7. The method according to claim 1, wherein deriving of the sparse evolving point cloud is done by a visual simultaneous localization and mapping (VSLAM) unit or by a visual inertial simultaneous localization and mapping (VISLAM) unit, with a progressional capturing of a series of images from at least one camera at the surveying instrument, and with a dynamically adapting of the sparse evolving point cloud of the environment progressively during runtime on basis of those images.

8. The method according to claim 1, wherein the progressional matching is done with a synchronizing of the sparse evolving point cloud and the previously derived 3D-geometry in at least three dimensions.

9. The method according to claim 1, wherein the progressional matching comprises a progressional deriving of a 2D-floorplan by a substantially vertical projecting of points of the sparse evolving point cloud to a substantially horizontal plane.

10. The method according to claim 1, further comprising an automatic identification of objects in the sparse evolving point cloud or in 2D-images of the environment, which objects are absent in the previously derived 3D-geometry or an automatic identification of deviations of dimensions in the sparse evolving point cloud compared to the previously derived 3D-geometry.

11. The method according to claim 10 further comprising supplementing or updating the previously derived 3D-geometry of the environment according to the identified objects or deviations.

12. A movable surveying instrument configured as a Laser-Scanner, a Theodolite, a GNSS-Surveying antenna, a Mobile-Mapping-System, a surveying pole unit, or a Surveying-Field-Controller configured to be carried by a human, a robot, a drone, a vehicle or a transport dolly in its environment along a substantially random trajectory, the moveable surveying instrument comprising:
at least one visual camera configured to constantly capture a series of images of an environment;
a three-dimensional (3D) point cloud evaluation unit configured to constantly derive an at least sparse evolving point cloud of the environment based on the series of images with a visual simultaneous localization and mapping (VSLAM) unit or by a visual inertial simultaneous localization and mapping (VISLAM) unit;
a 3D-geometry access unit, configured to access a previously derived 3D-geometry of at least part of the environment, wherein said previously derived 3D-geometry is derived from a previously captured 3D measurement;
a matching unit configured to constantly match the sparse evolving point cloud and the previously derived 3D-geometry with a minimizing of a function that is configured to model a distance between the sparse point cloud and the previously derived 3D-geometry; and
a localization unit configured to continuously derive and provide a localization or orientation of the surveying instrument in the environment with respect to the previously derived 3D-geometry based on a result of the matching unit.

13. The movable surveying instrument according to claim 12, wherein the matching unit comprises a solver unit configured for an optimization problem that is configured to constantly optimize a localization of the surveying instrument with respect to the previously derived 3D-geometry.

14. The movable surveying instrument according to claim 12, wherein the sparse evolving point cloud is derived by a visual simultaneous localization and mapping (VSLAM) unit or by a visual inertial simultaneous localization and mapping (VISLAM) unit, configured such that the dynamically adapting sparse evolving point cloud of the environment is progressively derived based on the series of images from the at least one camera at the surveying instrument, and
a spatial measurement unit of the surveying instrument is configured to provide its measurements referenced to the localization or orientation of the surveying instrument.

15. A non-transitory machine readable medium comprising instructions, which when executed by a processor performs the method of claim 1.

16. The method according to claim 1, wherein,
the previously derived 3D-geometry is a 3D point cloud, or
the previously captured 3D measurement is a scan taken with a terrestrial laser scanner.

17. The method according to claim 16, wherein the previously captured 3D measurement are several scans registered relative to each other taken with the terrestrial laser scanner from different locations.

18. The movable surveying instrument according to claim 12, wherein,
   the previously derived 3D-geometry is a 3D point cloud, or
   the previously captured 3D measurement is a scan taken with a terrestrial laser scanner.

19. The method according to claim 1, wherein the surveying pole unit is configured for
   being attached to a surveying pole, or
   being comprised by a GNSS-Surveying antenna which is attached to the surveying pole.

20. The movable surveying instrument according to claim 12, wherein the surveying pole unit is configured for
   being attached to a surveying pole, or
   being comprised by a GNSS-Surveying antenna which is attached to the surveying pole.

\* \* \* \* \*